United States Patent [19]
Kawahara et al.

[11] Patent Number: 5,453,346
[45] Date of Patent: Sep. 26, 1995

[54] OPTICAL INFORMATION RECORDING MEDIUM HAVING PROTECTION LAYERS WITH DIFFERENT PROPERTIES ON BOTH SIDES OF AN OPTICAL ACTIVE LAYER

[75] Inventors: Katsumi Kawahara, Kadoma; Shigeaki Furukawa, Nara; Noboru Yamada, Hirakata, all of Japan

[73] Assignee: Matsushita Electric Industrial Co., Ltd., Osaka, Japan

[21] Appl. No.: 219,109

[22] Filed: Mar. 29, 1994

[30] Foreign Application Priority Data

Mar. 29, 1993 [JP] Japan .................................. 5-069636

[51] Int. Cl.$^6$ ................................ G11B 7/24; G11B 7/26
[52] U.S. Cl. ........................ 430/273; 430/945; 369/284
[58] Field of Search ....................... 430/273, 271, 430/270, 495, 945; 369/283, 288, 284

[56] References Cited

U.S. PATENT DOCUMENTS

| | | | |
|---|---|---|---|
| 4,847,132 | 7/1989 | Takao et al. | 428/64 |
| 5,098,761 | 3/1992 | Watanabe et al. | 428/64 |
| 5,191,565 | 3/1993 | Inoue et al. | 369/284 |
| 5,194,363 | 3/1993 | Yoshioka | 430/271 |

FOREIGN PATENT DOCUMENTS

| | | | |
|---|---|---|---|
| 63-103453 | 5/1988 | Japan . | |
| 2-134741 | 5/1990 | Japan | 369/283 |
| 3-241539 | 10/1991 | Japan . | |

Primary Examiner—Charles L. Bowers, Jr.
Assistant Examiner—John A. McPherson
Attorney, Agent, or Firm—Ratner & Prestia

[57] ABSTRACT

In a phase change optical disk wherein a first heat-resistant protection layer, an optical active layer showing a reversible phase change between a crystal state and an amorphous state, and a second heat-resistant protection layer are laminated on a substrate in this order, both of the first and the second heat-resistant protection layers are made of a mixture of a chalcogenide and a vitrification accelerating material. Further, a mixture ratio of the vitrification accelerating material in the second heat-resistant protection layer is larger than that in the first heat-resistant protection layer. Thereby, it becomes possible that the first heat-resistant protection layer has the mixing ratio which gives the refractive index value bringing suitable optical properties, while the second heat-resistant protection layer has the different mixing ratio which gives the thermal conductivity bringing suitable thermal properties. As a result, a phase change optical disk having high sensitivity, improved life characteristics in repeated record/erasure operations and wide production margin is provided.

20 Claims, 7 Drawing Sheets

OPTICAL INFORMATION RECORDING MEDIUM HAVING PROTECTION LAYERS WITH DIFFERENT PROPERTIES ON BOTH SIDES OF AN OPTICAL ACTIVE LAYER

BACKGROUND OF THE INVENTION

1. Field of the Invention

The present invention relates to an optical information recording medium for recording, reproducing and erasing information signals using optical means, and a method of fabricating the same. More particularly, it relates to a phase change optical disk employing a phase change of an optical active layer.

2. Description of the Related Art

A technique for recording information signals by using a physical or chemical change, which is locally induced by a laser beam irradiation, of an optical active layer formed on a substrate has been well-known. Such a technique is put to practical use, for example, as a data-filing optical disk device. Particularly, information signals can be rewritten easily by using a phase change material or a magneto-optical material as the optical active layer.

A rewritable phase change optical disk typically has a structure wherein a first heat-resistant protection layer (a dielectric layer), an optical active layer (a recording layer) and a second heat-resistant protection layer (another dielectric layer) are formed on a transparent disk substrate in this order. Furthermore, a reflection layer is often formed on the second heat-resistant protection layer.

In the phase change optical disk, a phase change in the state of the optical active layer is utilized for record/erasure operations of information signals, as described hereinafter.

When a portion of the optical active layer is melted by heating induced by a laser beam irradiation and then quenched, the optical active layer is locally converted into an amorphous state. Thereby, an information signal is recorded therein. On the other hand, in order to erase a recorded information signal, the optical active layer is melted by heating induced by a laser beam irradiation and then cooled slowly so as to crystallize.

Reproducing of recorded information signals is also conducted by a laser beam irradiation, which utilizes large differences of a light absorption index and a light reflection coefficient between a region of amorphous state (a recorded mark region) and a region of a crystal state (a non-recorded region) of the optical active layer.

The optical active layer having the above-described features is formed on a substrate having grooves for guiding a laser beam.

Practical record/erasure operations of information signals is carried out by irradiation of a laser beam with a half-width of about 1 μm. In this case, the intensity of the laser beam is modulated so as to have a peak power intensity and a bias power intensity depending on an information signal to be recorded.

For example, when a laser beam modulated in amplitude as described above irradiates on a phase change optical disk while rotating, a portion of the optical active layer heated by the laser beam with the peak power intensity is quenched after being heated beyond the melting temperature. Thus, the material in the portion is converted into an amorphous state, irrespective of the phase state before the laser beam irradiation (i.e., wheather it was an amorphous state or a crystal state). As a result, the recorded mark region is formed and consequently an information signal is recorded therein.

On the other hand, a portion of the optical active layer irradiated by a laser beam with the bias power intensity is heated beyond the crystallization temperature of the material of the optical active layer. Thus, a recorded information signal is erased.

As explained in the above mechanism of record/erasure operations, the optical active layer of the phase change optical disk has to endure repeated temperature rises up to the melting temperature or the crystallization temperature or more by the laser beam irradiation. In order to achieve good performance properties even under such a severe situation, a first and a second heat-resistant protection layers are provided on both sides of the optical active layer.

The function of the first and the second heat-resistant protection layers are as follows: Firstly, thermal damage of the substrate surface, deformation or evaporation of the optical active layer due to repeated record/erasure operations are reduced. Secondly, optical characteristics of the phase change optical disk are optimized. For example, the difference between the optical characteristics before recording and those after recording is enlarged. Also, a light absorption index of the optical active layer is optimized. Thirdly, record/erasure properties of information signals can be optimized by selecting suitable materials for the heat-resistant protection layers, since the thermal conduction properties thereof has a large influence on the heating/cooling process of the optical active layer.

The material of the heat-resistant protection layer is required to have the following properties: high optical transparency, a high melting temperature, high mechanical strength, suitable thermal constants (a thermal conductivity and a specific heat), a suitable refractive index and chemical stability. The reasons are as follows.

For transmitting a laser beam to the optical active layer with a high efficiency, the heat-resistant protection layer is preferably transparent because the laser beam penetrates therethrough.

When the melting temperature of the heat-resistant protection layer is lower than a thermal transformation temperature of the optical active layer, the heat-resistant protection layer changes its state earlier than the optical active layer during the heating/cooling process of record/erasure operations. In order to prevent such a problem, the heat-resistant protection layer preferably has a high melting temperature.

In addition, preferably, the heat-resistant protection layer is mechanically strong enough to prevent cracking in the heating/cooling process.

The following trade-off relation exists as to thermal properties of the heat-resistant protection layer. When the heat-resistant protection layer has too large a thermal conductivity, the energy applied by a laser beam irradiation thereto is liable to dissipate easily. This means a poor energy efficiency and a laser beam with a large irradiation energy is required for heating the optical active layer beyond the melting temperature thereof. Consequently, in order to obtain a phase change optical disk with a high sensitivity by improving energy efficiency, the thermal conductivity of the heat-resistant protection layer is preferably small.

On the other hand, however, too small a thermal conductivity of the heat-resistant protection layer makes it difficult to rapidly convert the optical active layer into an amorphous state by-quenching, that is, to form a recorded mark region. In addition, there is another problem in that a temperature difference between the center portion and the peripheral portion of the recorded mark region becomes larger because of less heat transfer therebetween. Particularly, when a laser beam with a large line speed is used for record/erasure operations, the heating/cooling period must becomes short. Thus, the erasure ratio decreases.

A suitable refractive index is required for the following reason. In order to improve energy efficiency of a phase change of the optical active layer caused by a laser beam irradiation, it is necessary to prevent reflection of an incident laser beam at the interface between the heat-resistant protection layer and the optical active layer as much as possible. Preferably, reflection of the laser beam therebetween is desired to be reduced to zero. Since a refractive index of the typical optical active layer containing Te as a main component is about 4, it is necessary to have a refractive index of the heat-resistant protection layer set to 4 or less so as to satisfy the non-reflection condition. For example, Japanese Laid-Open Patent Publication No. 63-103453 discloses a calculated result that a preferable refractive index of the heat-resistant protection layer exists in a range between 2 and 3.

As the material which meets the above requirements, oxides, nitrides, carbides, fluorides and mixture thereof have been used, heretofore. On the other hand, U.S. Pat. No. 4,847,132 discloses using a mixture of chalcogenides and vitrification accelerating materials as the material for the heat-resistant protection layer. This mixture can be obtained by mixing chalcogenides (e.g. ZnS, ZnSe, etc.) which are essentially crystalline materials with substances which easily vitrifies (e.g. $SiO_2$, $GeO_2$, $TeO_2$, $Al_2O_3$, $Ta_2O_5$, $Y_2O_3$, etc.). By mixing, the vitrification accelerating material separates crystal grains of the chalcogenide so as to make the grains finer. As a result, the mixed material is converted into an amorphous state and the thermal conductivity thereof becomes small.

As described previously, when the thermal conductivity of the heat-resistant protection layer becomes small, heat generated at a certain portion in the optical active layer by a laser beam irradiation is less likely to dissipate into the surroundings through the heat-resistant protection layer. Accordingly, it becomes possible to induce a phase change by a smaller laser beam power so as to form a recorded mark region, which results in high sensitivity. In addition, since a smaller laser irradiation power is required for recording/ erasing information signals in this case, the optical disk is less damaged thermally. Consequently, an endurable life in repeated record/erasure operations is improved.

However, the above-mentioned mixture of the chalcogenide and the vitrification accelerating material has a problem in that when the thermal conductivity is reduced by conversion into an amorphous state due to mixing, the refractive index is reduced simultaneously. As described previously, the refractive index of the heat-resistant protection layer influences transmitting efficiency of the irradiated laser beam to the optical active layer. Accordingly, both of the thermal conductivity and the refractive index of the heat-resistance protection layer must be optimized so as to attain good performance properties of the phase change optical disk.

On the other hand, Japanese Laid-Open Patent Publication No. 3-241539 teaches that the life characteristics in repeated record/erasure operations are improved by using a material of the second heat-resistant protection layer which has a different thermal conductivity from that of the first heat-resistant protection layer (e.g. oxides, nitrides, etc.).

In this case, however, when the second heat-resistant protection layer composed of oxides, nitrides or the like is formed in the same vacuum vessel as that used for forming the other layers, contamination of the layers is liable to be arisen, which brings bad affects on the physical and chemical properties of the layers. Therefore, a plurality of vacuum vessels must be used for forming different layers, which is disadvantage from the standpoint of manufacturing cost.

SUMMARY OF THE INVENTION

An optical information recording medium of this invention comprises an optical active layer having a first and a second surfaces, said optical active layer showing a reversible phase change between a crystal state and an amorphous state; a first protection layer being in contact with said first surface of said optical active layer; and a second protection layer being in contact with said second surface of said optical active layer, wherein said first and said second protection layers are made of the same mixture of a plurality of compounds, and a mixture ratio of said mixture is different between said first protection layer and said second protection layer.

In one embodiment, the optical information recording medium further comprises a reflection layer on said second protection layer.

A method of fabricating an optical information recording medium of this invention comprises the steps of: providing a first protection layer made of a mixture of a plurality of compounds; forming an optical active layer on said first protection layer, said optical active layer showing a reversible phase change between a crystal state and an amorphous state; and forming a second protection layer on said optical active layer, said second protection layer being made of the same mixture of said plurality of compounds as said first protection layer, wherein a mixture ratio of said mixture is different between said first protection layer and said second protection layer.

In one embodiment, the method further comprises the step of forming a reflection layer on said second protection layer.

In one embodiment, said mixture ratio in said first protection layer is a value which gives a suitable value of a refractive index for optimizing a transmitting efficiency of an radiated laser beam to said optical active layer, and said mixture ratio in said second protection layer is a value which gives a suitable value of a thermal conductivity for achieving an efficient heat dissipation from said optical active layer.

In another embodiment, one of said plurality of compounds is a chalcogenide and another one of said plurality of compounds is a vitrification accelerating material. Preferably, said chalcogenide is selected from a group consisting of ZnS and ZnSe. Preferably, said vitrification accelerating material is selected from a group consisting of $SiO_2$, $GeO_2$, $TeO_2$, $Al_2O_3$, $Ta_2O_5$ and $Y_2O_3$.

In still another embodiment, said mixture ratio of said vitrification accelerating material in said second protection layer is larger than said mixture ratio of said vitrification accelerating material in said first protection layer.

Preferably, said mixture ratio of said vitrification accelerating material in said first protection layer is in a range from 10 to 30 mol %, and said mixture ratio of said vitrification accelerating material in said second protection layer is 30 mol % or more.

Further preferably, said mixture ratio of said vitrification accelerating material in said first protection layer is in a range from 15 to 25 mol %.

In still another embodiment, said mixture ratio of said vitrification accelerating material in said second protection layer is in a range of 30 to 70 mol %.

Thus, the invention described herein makes possible the advantages of (1) providing an optical information recording medium having high sensitivity, excellent life characteristics in repeated record/erasure operations and wide production margin, which can be produced easily without causing remarkable increase of production processes and costs and (2) providing a method of fabricating the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples.

EXAMPLE 1

Figure 1:
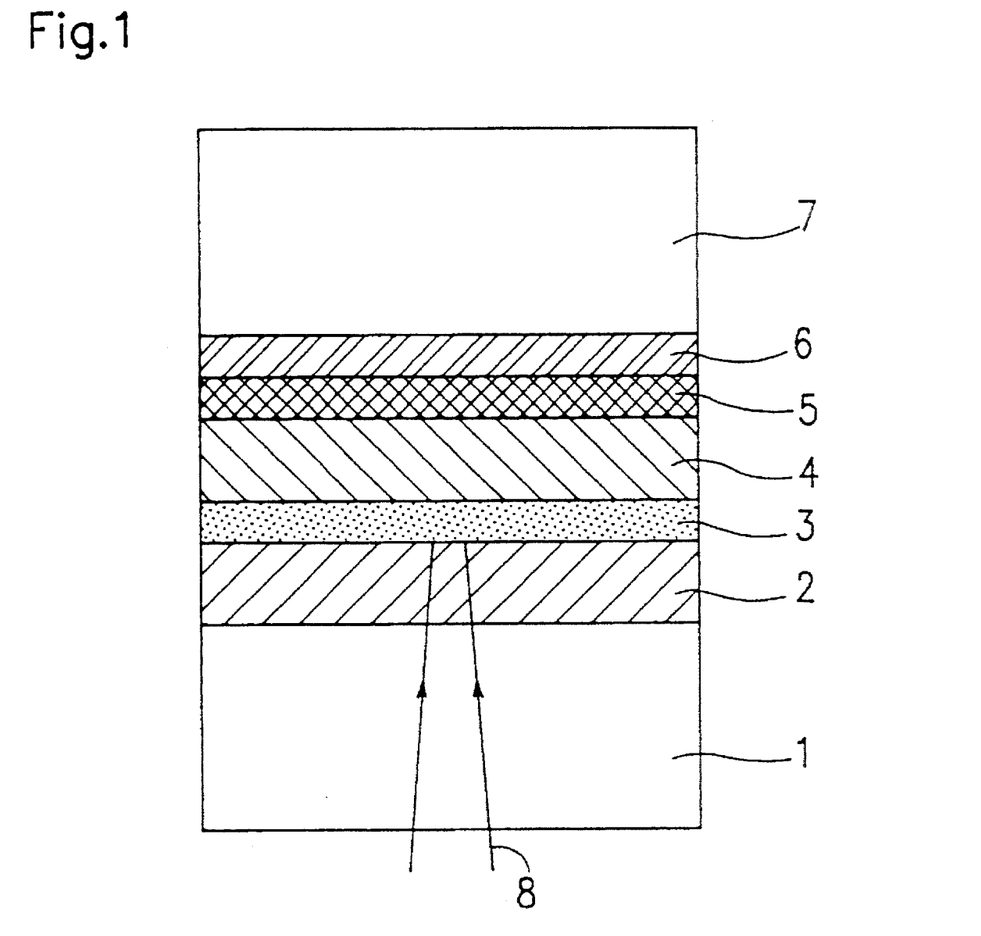
FIG. 1 is a schematic cross-sectional view illustrating a structure of a phase change optical disk in an embodiment of the present invention.

A typical structure of a phase change optical disk of the present invention is shown in FIG. 1.

On a substrate 1, a first heat-resistant protection layer 2, an optical active layer 3, a second heat-resistant protection layer 4 and a reflection layer 5 are formed in this order. Further, a protective substrate 7 of the same material as that of the substrate 1 is attached on the reflection layer 5 by an adhesive 6. Alternatively, the protective substrate 7 may be formed by spin-coating of a resin in place of attaching the substrate 7 as shown in FIG. 1. A laser beam 8 radiates from the side of the substrate 1 so that information signals are recorded/erased thereby.

Alternatively, two phase change optical disks having the structure as shown in FIG. 1 may be laminated to each other by an adhesive by inserting an intermediate substrate (not shown) therebetween so as to provide a structure capable of recording, reproducing and erasing of information signals from both surfaces. Instead, providing two phase change optical disks having no protective substrate 7, a similar structure can be obtained by directly attaching their reflection layers 5 to each other by an adhesive.

Next, the material of each layer will be explained below.

As the substrate 1, a resin plate of PMMA (polymethyl methacrylate) or PC (polycarbonate), or a glass plate is used. Such a substrate has a flat surface and normally on the surface thereof, concave and convex profiles are formed for guiding a laser beam such as spiral grooves or concentric-shaped continuous grooves (track), pit rows or the like.

The first heat-resistant protection layer 2 and the second heat-resistant protection layer 4 are made of a mixture of a crystalline material and a vitreous material. This mixture has the softening temperature and the melting temperature higher than the melting temperature of the material of the optical active layer 3. In addition, the mixture used in the first and the second heat-resistant protection layers 2 and 4 is not solid-soluble into the material of the optical active layer 3.

More particularly, the mixture is made of a crystalline chalcogenide and a vitrification accelerating material. The above crystalline chalcogenide is preferably ZnS or ZnSe, and the above vitrification accelerating material is preferably $SiO_2$, $Y_2O_3$, $Al_2O_3$, $Ta_2O_5$ or $TeO_2$. In this example, ZnS was used as the chalcogenide and $SiO_2$ was used as the vitrification accelerating material. Preferred range of the thickness of the first heat-resistant protection layer 2 is 85 to 130 nm, and that of the second heat-resistant protection layer 4 is 100 to 200 nm.

In the optical active layer 3, the material which shows a reversible phase change between a crystal state and an amorphous state is used. For example, it is made of Ge-As-Te, Te-Ge-Sb-Se or Ge-Sb-Te alloy. In this example, GeSbTe alloy was used.

Further, the thickness of the optical active layer 3 is preferably 30 to 50 nm. When the thickness thereof is smaller than 25 nm, the amplitude of the information signals on recording becomes small. On the other hand, when the thickness is larger than 55 nm, temperature cannot increase rapidly due to heating unless a laser beam power is increased, which results in a low sensitivity.

The reflection layer 5, which is provided so as to enhance a light absorption index of the optical active layer 3, is made of a metal such as Au, Al, Ni, Cr, etc. or an alloy thereof. In this example, an Au layer was used.

These layers are formed by such methods as an electron beam evaporation method, a sputtering method, an ion plating method, a CVD method, a laser sputtering method or the like. In this example, as described in detail hereinafter, each layer was formed by an RF sputtering method which is also one of typical methods for the purpose.

One of the significant features of the phase change optical disk of the present invention is that the first and the second heat-resistant protection layers 2 and 4 have different mixture ratios of the vitrification accelerating material to the chalcogenide from each other (in this example, it means a mixture ratio of $SiO_2$ to ZnS, hereinafter referred to as a mixture ratio of $SiO_2$). Particularly, the mixture ratio of $SiO_2$ in the first heat-resistant protection layer 2 was set at 20 mol % and that in the second heat-resistant protection layer 4 was varied between 10 and 100 mol % so as to examine the influence on operation properties of the phase change optical disk.

The mixture ratio of $SiO_2$ in the first heat-resistant protection layer 2 was selected for the following reason. In order to improve performance properties of the phase change optical disk, it is desirable to optimize differences of a light reflection coefficient and a light absorption index between the recorded mark region and the non-recorded region formed in the optical active layer 3. The differences therebetween vary remarkably particularly depending on optical constants (a refractive index n, an extinction coefficient k) of the first heat-resistant protection layer 2. Accordingly, in order to optimize those differences between the recorded mark region and the non-recorded region, it is desired that the mixture ratio of $SiO_2$ in the first heat-resistant protection layer 2 is in a range of 10 to 50 mol %, preferably from 10 to 30 mol %, more preferably 15 to 25 mol %.

Figure 2:
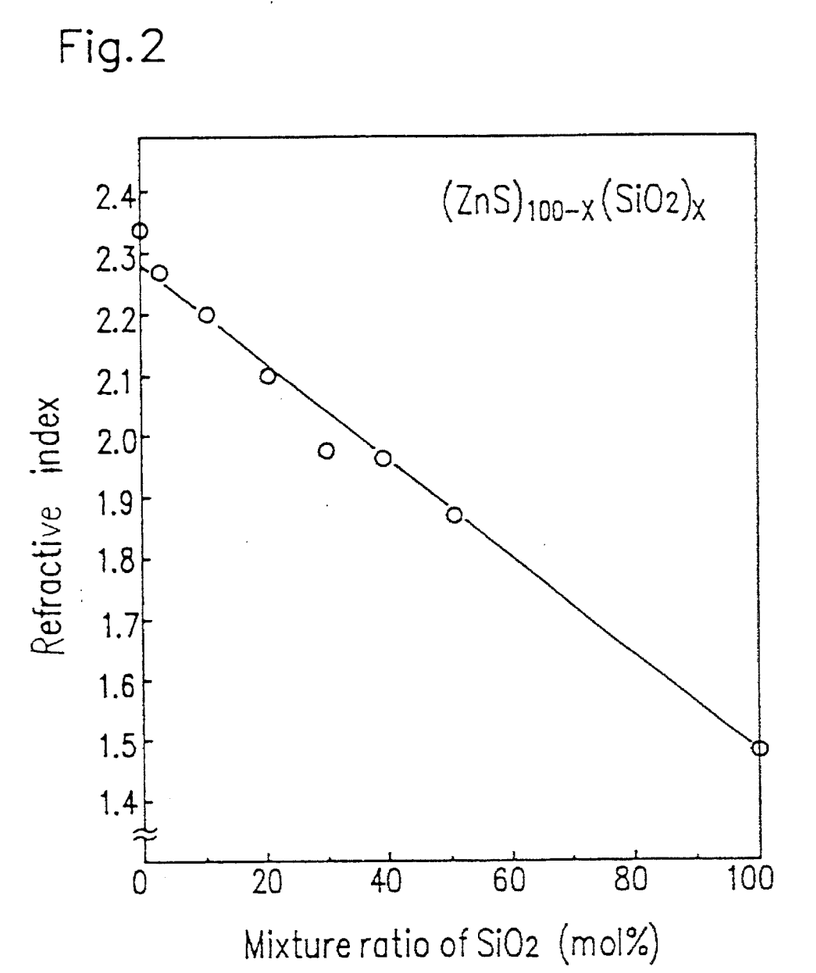
FIG. 2 is a graph illustrating the relationship between a refractive index and a mixture ratio of $SiO_2$ in a heat-resistant protection layer.

FIG. 2 is a graph illustrating the relationship between a refractive index of the heat-resistant protection layer and a mixture ratio of $SiO_2$ therein. As is apparent from this Figure, the refractive index decreases as the mixture ratio of $SiO_2$ increases.

The mixture ratio of $SiO_2$ at 20 mol % in the first heat-resistant layer 2 in this example corresponds to the refractive index of 2.1. This value is suitable for accomplishing an effective non-reflection condition of the radiated laser beam at the interface between the first heat-resistant protection layer 2 and the optical active layer 3.

On the other hand, the mixture ratio of $SiO_2$ in the second heat-resistant protection layer 4 is varied in this example and, for example, its value of 50 mol % corresponds to the refractive index of 1.85. This value is comparatively small in view of optical properties. However, since the second heat-resistant protection layer 4 exists on the optical active layer 3, the refractive index value of the second heat-resistant protection layer 4 does not affect transmitting efficiency of the laser beam to the optical active layer 3.

Furthermore, as the mixture ratio of $SiO_2$ increases, crystal grains of ZnS become finer, which results in a smaller thermal conductivity. Consequently, energy of the radiated laser beam is used efficiently to raise the temperature of the optical active layer 3. Thus, the required irradiation power of the laser beam can be reduced.

In addition, the excessive increase of temperature of the optical active layer 3 is restrained during record/erasure operations. Accordingly, the optical active layer 3 and the first and the second heat-resistant protection layers 2 and 4 suffer less thermal damage and so life characteristics in repeated record/erasure operations can improve.

As described above, according to the present invention, the first and the second heat-resistant protection layers 2 and 4 have different values of the mixture ratio of $SiO_2$ from each other. Thereby, both of the refractive index and the thermal conductivity of the heat-resistant protection layers can be optimized, although both layers are made of the same mixed material. Thus, performance properties of the phase change optical disk are improved from the viewpoints of both the optical aspect and the thermal aspect. As a result, high sensitivity and long life in repeated record/erasure operations are realized.

In addition, since the first and the second heat-resistant protection layers 2 and 4 are formed of the same mixture of materials, the present invention can avoid contamination problems in the fabrication process, which often happens when each of those layers is made of different materials from each other, without adding additional fabricating steps nor increasing costs. Further, design margin becomes wider, and high efficiency in fabrication can be accomplished because the refractive index of the second heat-resistant protection layer 4 is reduced.

Next, the fabrication process of the phase change optical disk shown in FIG. 1 will be explained below.

Figure 3:
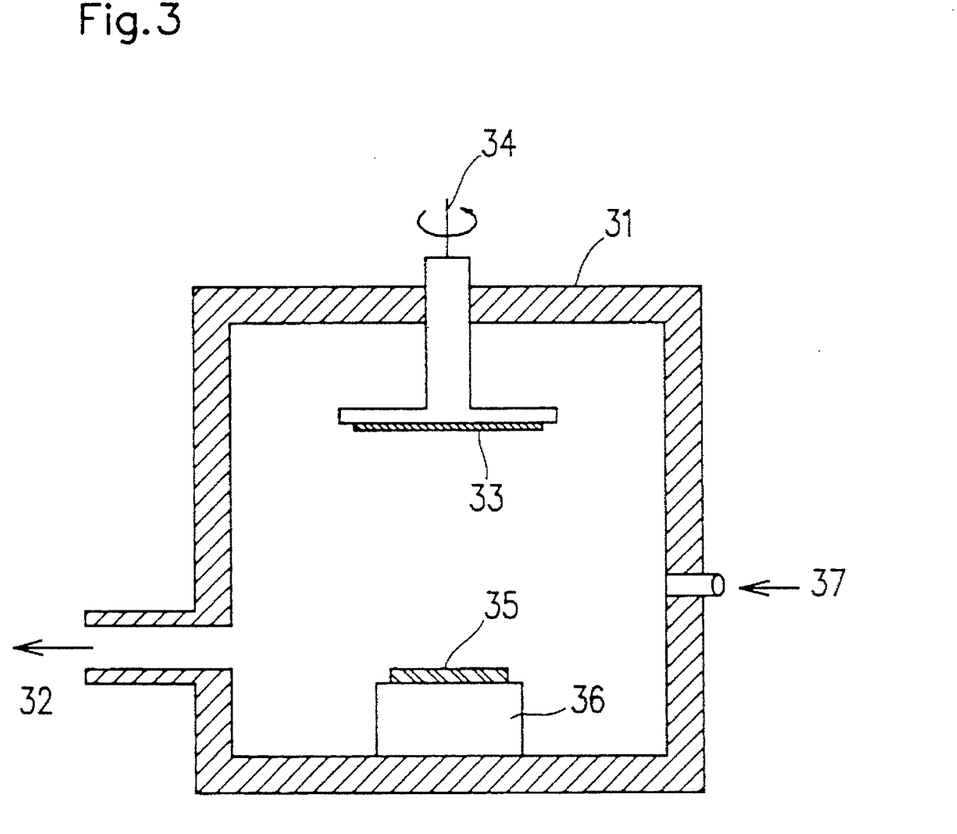
FIG. 3 is a schematic diagram of an RF sputtering apparatus used in the production process of the phase change optical disk in the embodiment of the present invention.

In this example, each layer of the phase change optical disk was formed using a conventional RF sputtering apparatus shown in FIG. 3. In a vacuum vessel 31, a substrate 33 on which each layer was to be formed was provided on a rotating shaft 34. A target 35 made of a constituent material of the layer to be sputtered was provided on a cathode 36. Then, the vacuum vessel 31 was evacuated through an exhaust opening 32 until the degree of vacuum reached the order of $10^{-6}$ Torr. Then, Ar gas was introduced through an inlet opening 37. Thereafter, a high-frequency voltage was applied between the substrate 33 and the cathode 36 while rotating the substrate 33 with the rotating shaft 34. The constituent of the target 35 was sputtered so as to be deposited on the substrate 33. Partial pressure of Ar gas was set at 1 mTorr during the sputtering process.

As a first step of the fabrication, a substrate 1 made of polycarbonate on which a groove for guiding a laser beam was formed was provided. On the substrate 1 as shown in FIG. 1, a $ZnS-SiO_2$ mixture layer having a thickness of 93 nm was formed as a first heat-resistant protection layer 2 with a sputtering power of 500 W. Then, a $Ge_2Sb_2Te_5$ alloy layer having a thickness of 40 nm was formed on the first heat-resistant protection layer 2 as an optical active layer 3 with a sputtering power of 100 W. Then, another $ZnS-SiO_2$ mixture layer having a thickness of 139 nm was formed thereon as a second heat-resistant protection layer 4 with a sputtering power of 500 W. Furthermore, an Au layer having a thickness of 10 nm was formed thereon as a reflection layer 5 with a sputtering power of 200 W. The temperature of the substrate 1 was not set any particular value in the above sputtering process. A protection substrate 7 of polycarbonate was then attached on the reflection layer 5 with a UV-curing adhesive 6.

The above values of thicknesses of each layer were selected in view of absorption efficiency of a laser beam to be radiated as well as optical constants, which would be easily understood by the those having ordinary skill in the art.

Then, various performance properties of the phase change optical disk thus formed were measured. The results will be explained hereinafter.

Figure 4:
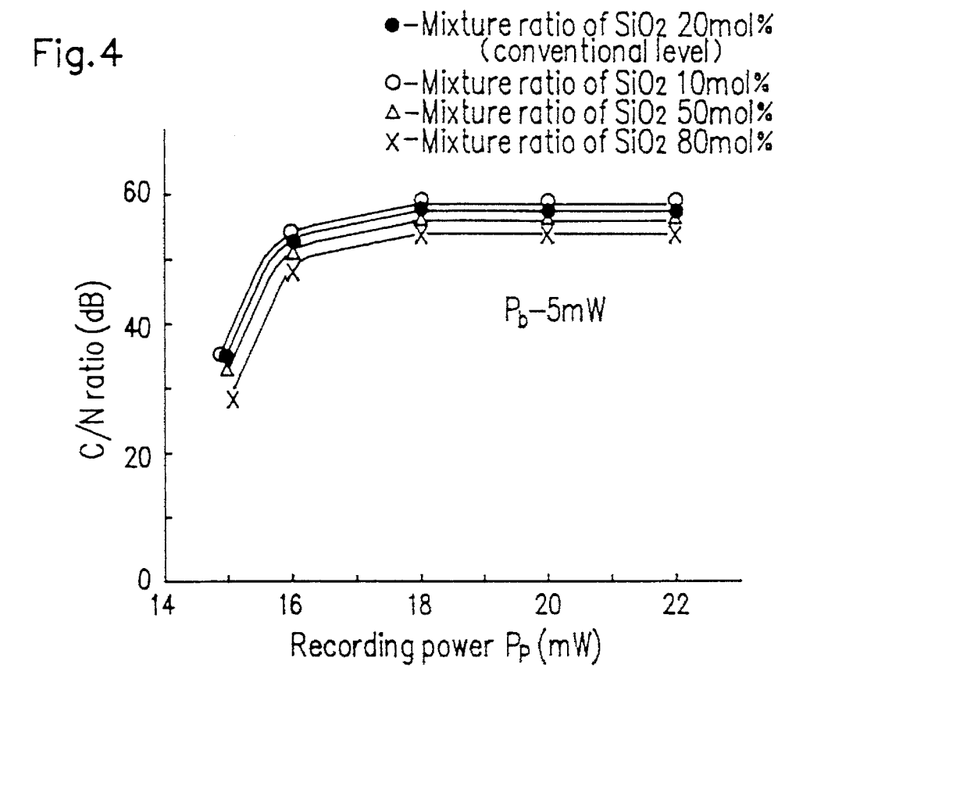
FIG. 4 is a graph illustrating the influence of a mixture ratio of $SiO_2$ in the second heat-resistant protection layer on a recording sensitivity (C/N ratio) in the phase change optical disk in the embodiment of the present invention.

FIG. 4 is a graph illustrating the influence of a mixture ratio of $SiO_2$ in the second heat-resistant protection layer 4 on a recording sensitivity (C/N ratio), which was measured in the following manner.

A laser beam ($\lambda=780$ nm, NA=0.55) modulated in amplitude between a recording power Pp (a peak power) and an erasing power Pb (a bias power) is radiated to the optical disk while rotating at a rate of 1800 rpm. Recording frequencies were set at frequencies f1 and f2, with which a length of the recorded mark to be formed became 0.9 μm and 2.4 μm, respectively, at a line speed of 20 m/s.

Under the above conditions, C/N ratio was measured at a erasing power of 5 mW. As is apparent from FIG. 4, the recording sensitivity (C/N ratio) does not significantly change even when the mixture ratio of $SiO_2$ in the second heat-resistant protection layer 4 changes.

Figure 5:
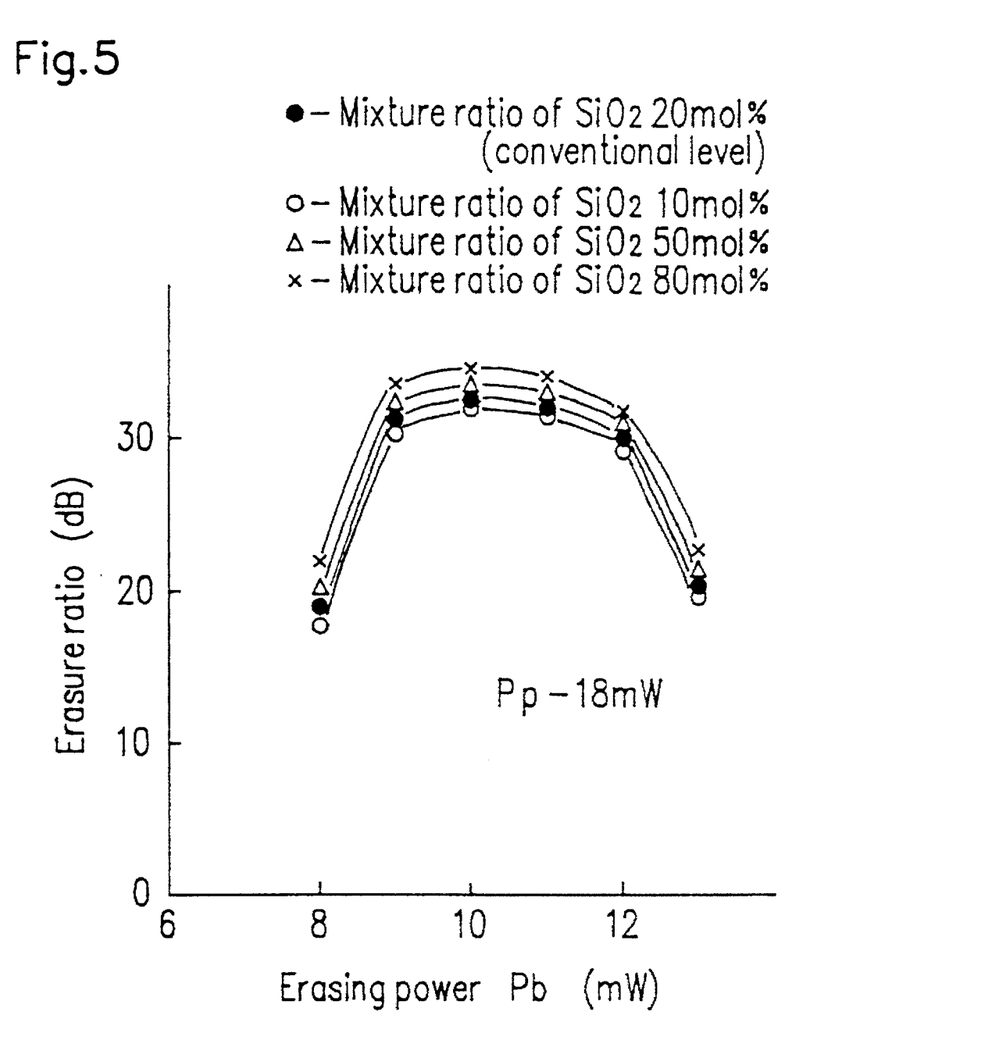
FIG. 5 is a graph illustrating the influence of a mixture ratio of $SiO_2$ in the second heat-resistant protection layer on an erasure ratio in the phase change optical disk in the embodiment of the present invention.

FIG. 5 is a graph illustrating the influence of a mixture ratio of $SiO_2$ in the second heat-resistant protection layer 4 on an erasing sensitivity (an erasure ratio). The same conditions were applied for the measurement as used in FIG. 4 and the erasure ratio was measured at a recording power of 18 mW. As a result, it was found that the erasure ratio does not change siginificantly even when the mixture ratio of $SiO_2$ in the second heat-resistant protection layer 4 changes.

As is apparent from the above results, the appropriate optical characteristics of the phase change optical disk was obtained even when the refractive index of the second heat-resistant protection layer 4 becomes small by increasing the mixture ratio of $SiO_2$ therein.

Figure 6:
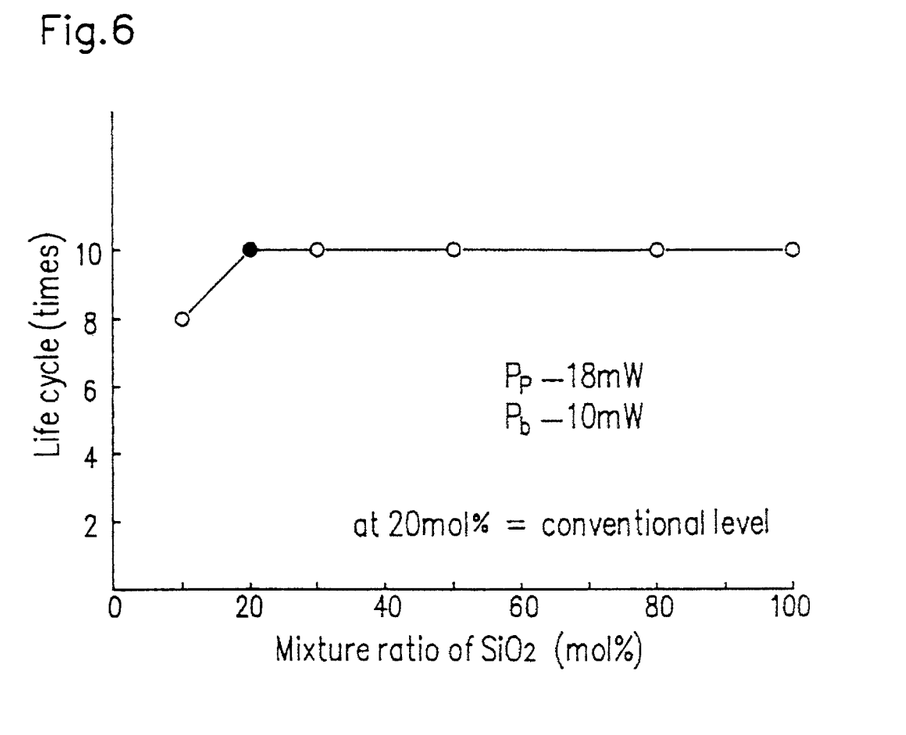
FIG. 6 is a graph illustrating the relationship between life characteristics in repeated record/erasure operations and a mixture ratio of $SiO_2$ in the second heat-resistant protection layer in the phase change optical disk in the embodiment of the present invention.

FIG. 6 is a graph illustrating the relationship between the mixture ratio of $SiO_2$ in the second heat-resistant protection layer 4 and life characteristics in repeated record/erasure operations. The similar measurement conditions were again applied as used for measuring the recording sensitivity characteristics and the erasure ratio characteristics. The differences from the previous cases are as follows: the recording power was set to 18 mW which was 2 mW higher than the point at which C/N ratio exceeded 50 dB in FIG. 4, and the erasing power was set to 10 mW which was the center of the erasing power margin as shown in FIG. 5.

Under these conditions, record/erasure operations were repeated up to 100,000 times. As a result, as shown in FIG. 6, when the mixture ratio of $SiO_2$ in the second heat-resistant protection layer 4 was 10 mol % which was smaller than that in the first heat-resistant protection layer 2, an endurable life of the phase change optical disk decreased. On the other hand, when the mixture ratio of $SiO_2$ in the second heat-resistance protection layer 4 was 20 mol % or larger, which was equal to or larger than that in the first heat-resistant protection layer 2, record/erasure operations were able to be repeated 100,000 times.

Moreover, endurability of the phase change optical disk fabricated as described above was examined under high temperature and high humidity environment in the following manner. The phase change optical disk was left under the environment of 80° C. and 80% RH for 100 hours, and then was observed by an optical microscope.

The results showed that micro-peelings occured between the layers when the mixture ratio of $SiO_2$ in the second heat-resistant protection layer 4 was 80 to 100 mol %. However, no such a peeling was observed in other cases.

Considering the above results, making the mixture ratio of $SiO_2$ in the second heat-resistant protection layer 4 larger than that in the first heat-resistant protection layer 2 does not remarkably affect various performance properties of the phase change optical disk. Since the preferred range of the mixture ratio of $SiO_2$ in the first heat-resistant protection layer 2 is 10 to 30 mol %, the mixture ratio of $SiO_2$ in the second heat-resistant protection layer 4 is preferably equal to or larger than 30 mol %. Futhermore, considering a possible peeling of the layers under high-temperature and high-humidity environment, it is desired that the mixture ratio of $SiO_2$ is more preferably in a range from 30 to 70 mol %.

EXAMPLE 2

In this example, a phase change optical disk having the same structure as that of the first example except not having the reflection layer 5 was fabricated by an RF sputtering method. In this example, the mixture ratio of $SiO_2$ in the second heat-resistant protection layer 4 was varied and influence thereof on a recording sensitivity, an erasure ratio and life characteristics in repeated record/erasure operations were examined.

The first heat-resistant protection layer 2 was made of $ZnS-SiO_2$ mixture having a thickness of 93 nm and a mixture ratio of $SiO_2$ of 20 mol %. The optical active layer 3 was made of $Ge_2Sb_2Te_5$, the same as the first example, but the thickness thereof was 50 nm. The second heat-resistant protection layer 4 with a thickness of 140 nm was made of $ZnS-SiO_2$ mixture and the mixture ratio of $SiO_2$ therein also varied.

With the phase change optical disk having the above structure, similar measurements of performance properties were carried out with the same conditions as for the first example.

Changing the mixture ratio of $SiO_2$ in the second heat-resistant protection layer 4 was verified to cause no significant influence on recording sensitivity and erasure ratio. In addition, from the similar measurement of the life characteristics in repeated record/erasure operations as conducted in the first example, it was confirmed that record/erasure operations were able to be repeated up to 100,000 times when the mixture ratio of $SiO_2$ in the second heat-resistant protection layer 4 was equal to or larger than 20 mol %.

As described above, it was confirmed that the same effect can be obtained even in the phase change optical disk having no reflection layer 5.

EXAMPLE 3

In this example, in accordance with the same way of fabricating as that described in the first example, the multilayer structure was formed by an RF sputtering method in which on the substrate 1, the first heat-resistant protection layer 2 made of $ZnS-SiO_2$ mixture having a thickness of 93 nm, the optical active layer 3 made of $Ge_2Sb_2Te_5$ having a thickness of 40 nm, the second heat-resistant protection layer 4 made of $ZnS-SiO_2$ mixture having a thickness of 139 nm and the reflection layer 5 made of Au having a thickness of 10 nm were formed in this order. In this example, the mixture ratio of $SiO_2$ in the second heat-resistant protection layer 4 was set to a constant value of 20 mol %, while that in the first heat-resistant protection layer 2 was varied. Thus, influences of the mixture ratio of $SiO_2$ in the first heat-resistant protection layer 2 on the performance properties of the phase change optical disk was examined in the same manner as the first example.

Figure 7:
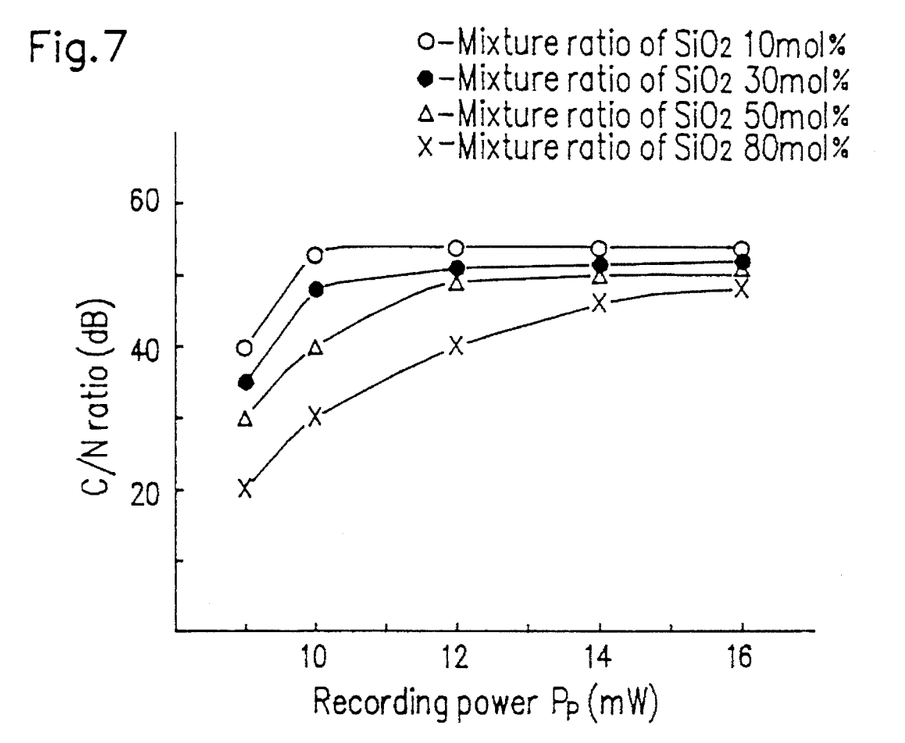
FIG. 7 is a graph illustrating the influence of a mixture ratio of $SiO_2$ in the first heat-resistant protection layer on a recording sensitivity (C/N ratio) in the phase change optical disk in another embodiment of the present invention.

FIG. 7 shows an influence of the mixture ratio of $SiO_2$ in the first heat-resistant protection layer 2 on a recording sensitivity (C/N ratio). Measurement was carried out under the same conditions as those of the first example.

FIG. 7 shows that the C/N ratio decreases as the mixture ratio of $SiO_2$ in the first heat-resistant protection layer 2 increases. Especially, significant decrease of C/N ratio was observed with a mixture ratio of $SiO_2$ over 30 mol %. The results clearly show that a refractive index of the first heat-resistant protection layer 2, which changes in accordance with changing of the mixture ratio of $SiO_2$ therein, has an remarkable influence on the recording sensitivity.

As a result, in order to obtain stable recording sensitivity in a wide range of the recording power, the mixture ratio of $SiO_2$ in the first heat-resistant protection layer 2 has preferably an appropriate small value. Preferred range thereof is from 10 to 30 mol %.

EXAMPLE 4

In this example, the multilayer structure was formed by an RF sputtering method in which on the substrate 1, the first heat-resistant protection layer 2 made of $ZnS-SiO_2$ mixture having a thickness of 93 nm (a mixture ratio of $SiO_2$ was 20 mol %), the optical active layer 3 made of $Ge_2Sb_2Te_5$ having a thickness of 40 nm, the second heat-resistant protection layer 4 made of $ZnS-SiO_2$ mixture having a thickness of 193 nm were formed in this order. Then, on the second heat-resistant protection layer 4, an Al alloy layer, in place of an Au layer, having a thickness of 50 nm was formed by an RF sputtering method. The mixture ratio of $SiO_2$ in the second heat-resistant protection layer 4 was varied and performance properties of the phase change optical disk were measured in the same manner as for the first example.

As a result, even in the case where an Al alloy layer was used as the reflection layer 5, changing the mixture ratio of $SiO_2$ in the second heat-resistant protection layer 4 was verified to cause no significant influence on the recording sensitivity and the erasure ratio.

In addition, from the similar measuring of the life characteristics in repeated record/erasure operations as conducted in the first example, it was confirmed that record/erasure operations were able to be repeated up to 100,000 times when the mixture ratio of $SiO_2$ in the second heat-resistant protection layer 4 was equal to or larger than 20 mol %.

From these results, it was confirmed that the same effect can be obtained even in the phase change optical disk having an Al alloy layer as the reflection layer 5.

EXAMPLE 5

In this example, as a chalcogenide to be mixed in the material of the first and the second heat-resistant protection layers 2 and 4, Zn-Se in place of Zn-S was used.

The multilayer structure was formed by an RF sputtering method in which on the substrate 1, the first heat-resistant protection layer 2 made of $ZnSe-SiO_2$ mixture having a thickness of 93 nm (the mixture ratio of $SiO_2$ was 20 mol %), the optical active layer 3 made of $Ge_2Sb_2Te_5$ having a thickness of 40 nm, the second heat-resistant protection layer 4 made of $ZnSe-SiO_2$ mixture having a thickness of 193 nm and the reflection layer 5 made of Au having a thickness of 10 nm were formed in this order. In this example, the mixture ratio of $SiO_2$ in the first heat-resistant protection layer 2 was set to a constant value of 20 mol %, while that in the second heat-resistant protection layer 4 was varied. Thus, influences of the mixture ratio of $SiO_2$ in the second heat-resistant protection layer 4 on the performance properties of the phase change optical disk was examined in the same manner as the first example.

As a result, even in the case where Zn-Se was used as a chalcogenide in the first and the second heat-resistant protection layers 2 and 4, changing the mixture ratio of $SiO_2$ in the second heat-resistant protection layer 4 was verified to cause no significant influence on a recording sensitivity and an erasure ratio.

In addition, from the similar measurement of the life characteristics in repeated record/erasure operations as conducted in the first example, it was confirmed that record/erasure operations were able to be repeated up to 100,000 times when the mixture ratio of $SiO_2$ in the second heat-resistant protection layer 4 was equal to or larger than 20 mol %.

From these results, it was confirmed that the same effect can be obtained even in the phase change optical disk having a mixture layer of Zn-Se and $SiO_2$ as the first and the second heat-resistant protection layers 2 and 4.

EXAMPLE 6

In this example, as a vitrification accelerating material to be mixed in the material of the first and the second heat-resistant protection layers 2 and 4, $GeO_2$ in place of $SiO_2$ was used.

The multilayer structure was formed by an RF sputtering method in which on the substrate 1, the first heat-resistant protection layer 2 made of $ZnS-GeO_2$ mixture having a thickness of 93 nm (the mixture ratio of $GeO_2$ was 20 mol %), the optical active layer 3 made of $Ge_2Sb_2Te_5$ having a thickness of 40 nm, the second heat-resistant protection layer 4 made of $ZnS-GeO_2$ mixture having a thickness of 193 nm and the reflection layer 5 made of Au having a thickness of 10 nm were formed in this order. In this example, the mixture ratio of $GeO_2$ in the first heat-resistant protection layer 2 was set to a constant value of 20 mol %, while that of the second heat-resistant protection layer 4 was varied. Thus, influences of the mixture ratio of $GeO_2$ in the second heat-resistant protection layer 4 on the performance properties of the phase change optical disk was examined in the same manner as the first example.

As a result, even in the case where $GeO_2$ was used as a vitrification accelerating material in the first and the second heat-resistant protection layers 2 and 4, changing the mixture ratio of $GeO_2$ in the second heat-resistant protection layer 4 was verified to cause no significant influence on the recording sensitivity and the erasure ratio.

In addition, from the similar measurement of the life characteristics in repeated record/erasure operations as conducted in the first example, it was confirmed that record/erasure operations were able to be repeated up to 100,000 times when the mixture ratio of $GeO_2$ in the second heat-resistant protection layer 4 was equal to or larger than 20 mol %.

From these results, it was confirmed that the same effect can be obtained even in the phase change optical disk having a mixture layer of Zn-S and $GeO_2$ as the first and the second heat-resistant protection layers 2 and 4. Similarly, the same effect can be obtained when $TeO_2$, $Al_2O_3$, $Ta_2O_5$ or $Y_2O_3$ are used as the vitrification accelerating material, which is not explained in detail here.

As described above by way of illustrating the examples, according to the present invention, in a phase change optical disk, in which the first and the second heat-resistant protection layers are made of a mixture of a chalcogenide and a vitrification accelerating material, the mixture ratio of the vitrification accelerating material to the chalcogenide in both heat-resistant protection layers is set so as to be different values from each other. More particularly, the mixture ratio of the vitrification accelerating material to the chalcogenide in the second heat-resistant protection layer is larger than that in the first heat-resistant protection layer.

Thus, it has been made possible to provide an optical information recording medium having high sensitivity, excellent life characteristics in repeated record/erasure operations and wide production margin, which can be produced easily without remarkable increase of production processes and costs. The method of fabricating the same is also provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information recording medium comprising:

an optical active layer having a first and a second surfaces, said optical active layer showing a reversible phase change between a crystal state and an amorphous state;

a first protection layer being in contact with said first surface of said optical active layer; and a second protection layer being in contact with said second surface of said optical active layer, wherein said first and said second protection layers are made of a mixture comprising a common plurality of compounds, and a mixture ratio of said mixture is different between said first protection layer and said second protection layer.

2. An optical information recording medium according to claim 1, wherein said mixture ratio in said first protection layer is a value which gives a suitable value of a refractive index for optimizing a transmitting efficiency of an radiated laser beam to said optical active layer, and said mixture ratio in said second protection layer is a value which gives a suitable value of a thermal conductivity for achieving an efficient heat dissipation from said optical active layer.

3. An optical information recording medium according to claim 1, further comprising a reflection layer on said second protection layer.

4. An optical information recording medium according to claim 1, wherein one of said plurality of compounds is a chalcogenide and another one of said plurality of compounds is a vitrification accelerating material.

5. An optical information recording medium according to claim 4, wherein said chalcogenide is selected from a group consisting of ZnS and ZnSe.

6. An optical information recording medium according to claim 4, wherein said vitrification accelerating material is selected from a group consisting of $SiO_2$, $GeO_2$, $TeO_2$, $Al_2O_3$, $Ta_2O_5$ and $Y_2O_3$.

7. An optical information recording medium according to claim 4, wherein said mixture ratio of said vitrification accelerating material in said second protection layer is larger than said mixture ratio of said vitrification accelerating material in said first protection layer.

8. An optical information recording medium according to claim 7, wherein said mixture ratio of said vitrification accelerating material in said first protection layer is in a range from 10 to 30 mol %, and said mixture ratio of said vitrification accelerating material in said second protection layer is 30 mol % or more.

9. An optical information recording medium according to claim 8, wherein said mixture ratio of said vitrification accelerating material in said first protection layer is in a range from 15 to 25 mol %.

10. An optical information recording medium according to claim 8, wherein said mixture ratio of said vitrification accelerating material in said second protection layer is in a range of 30 to 70 mol %.

11. A method of fabricating an optical information recording medium comprising the steps of:

providing a first protection layer made of a mixture of a plurality of compounds;

forming an optical active layer on said first protection layer, said optical active layer showing a reversible phase change between a crystal state and an amorphous state; and forming a second protection layer on said optical active layer, said second protection layer also being made of said mixture of said plurality of compounds as said first protection layer, wherein a mixture ratio of said mixture is different between said first protection layer and said second protection layer.

12. A method according to claim 11, wherein said mixture ratio in said first protection layer is a value which gives a suitable value of a refractive index for optimizing a transmitting efficiency of an radiated laser beam to said optical active layer, and said mixture ratio of said second protection layer is a value which gives a suitable value of a thermal conductivity for achieving an efficient heat dissipation from said optical active layer.

13. A method according to claim 11, further comprising the step of forming a reflection layer on said second protection layer.

14. A method according to claim 11, wherein one of said plurality of compounds is a chalcogenide and another one of said plurality of compounds is a vitrification accelerating material.

15. A method according to claim 14, wherein said chalcogenide is selected from a group consisting of ZnS and ZnSe.

16. A method according to claim 14, wherein said vitrification accelerating material is selected from a group consisting of $SiO_2$, $GeO_2$, $TeO_2$, $Al2O_3$, $Ta_2O_5$ and $Y_2O_3$.

17. A method according to claim 14, wherein said mixture ratio of said vitrification accelerating material in said second protection layer is larger than said mixture ratio of said vitrification accelerating material in said first protection layer.

18. A method according to claim 17, wherein said mixture ratio of said vitrification accelerating material in said first protection layer is in a range from 10 to 30 mol %, and said mixture ratio of said vitrification accelerating material in said second protection layer is 30 mol % or more.

19. A method according to claim 18, wherein said mixture ratio of said vitrification accelerating material in said first protection layer is in a range from 15 to 25 mol %.

20. A method according to claim 18, wherein said mixture ratio of said vitrification accelerating material in said second protection layer is in a range of 30 to 70 mol %.

* * * * *